United States Patent [19]

Healy

[11] 4,241,931
[45] Dec. 30, 1980

[54] AUTOMOBILE TIRE RIDING VEHICLE

[76] Inventor: Donald H. Healy, 3315 NW. Golden Pl., Seattle, Wash. 98107

[21] Appl. No.: 30,350

[22] Filed: Apr. 16, 1979

[51] Int. Cl.³ ............................................. B62K 17/00
[52] U.S. Cl. ............................... 280/205; 280/87.04 R
[58] Field of Search ............... 280/205, 206, 207, 208, 280/200, 242 R, 219, 87.04 R, 87.01, 11.24, 11.18 R; 180/21

[56] References Cited

U.S. PATENT DOCUMENTS

| 4,106,786 | 8/1978 | Talbott | 280/205 |
| 4,163,567 | 8/1979 | Barber | 280/208 |

FOREIGN PATENT DOCUMENTS

| 127311 | 4/1948 | Australia | 280/207 |
| 355509 | 6/1922 | Fed. Rep. of Germany . | |
| 2117349 | 10/1971 | Fed. Rep. of Germany . | |
| 332203 | 5/1903 | France . | |
| 932124 | 11/1947 | France . | |
| 1305708 | 8/1962 | France | 280/219 |
| 8295 | of 1889 | United Kingdom | 280/207 |

Primary Examiner—John J. Love
Assistant Examiner—D. W. Underwood

[57] ABSTRACT

A discarded automobile tire is utilized as a part of a mobile toy or exercising device. A tire riding vehicle is provided with a base support extending parallel to the space between the two tire beads of the automobile tire. Two spaced axles extend normal to and are supported by the base and in turn support spaced apart rollers which ride on and are supported by the automobile tire beads. Flanges are associated with the rollers, are disposed inside of and abut against the tire beads, and thus maintain the rollers against lateral displacement from the tire beads. A platform is supported by the axles and supports a rider on the vehicle. A platform is preferably provided for each foot of a rider and carries a spring loaded brake and also pole supports. Poles so supported may be used by a rider to guide, steer, and brake the vehicle. The poles are spring loaded and normally in non-braking positions. Rollers or tongues are employed resisting release of the vehicle from the automobile tire.

10 Claims, 8 Drawing Figures

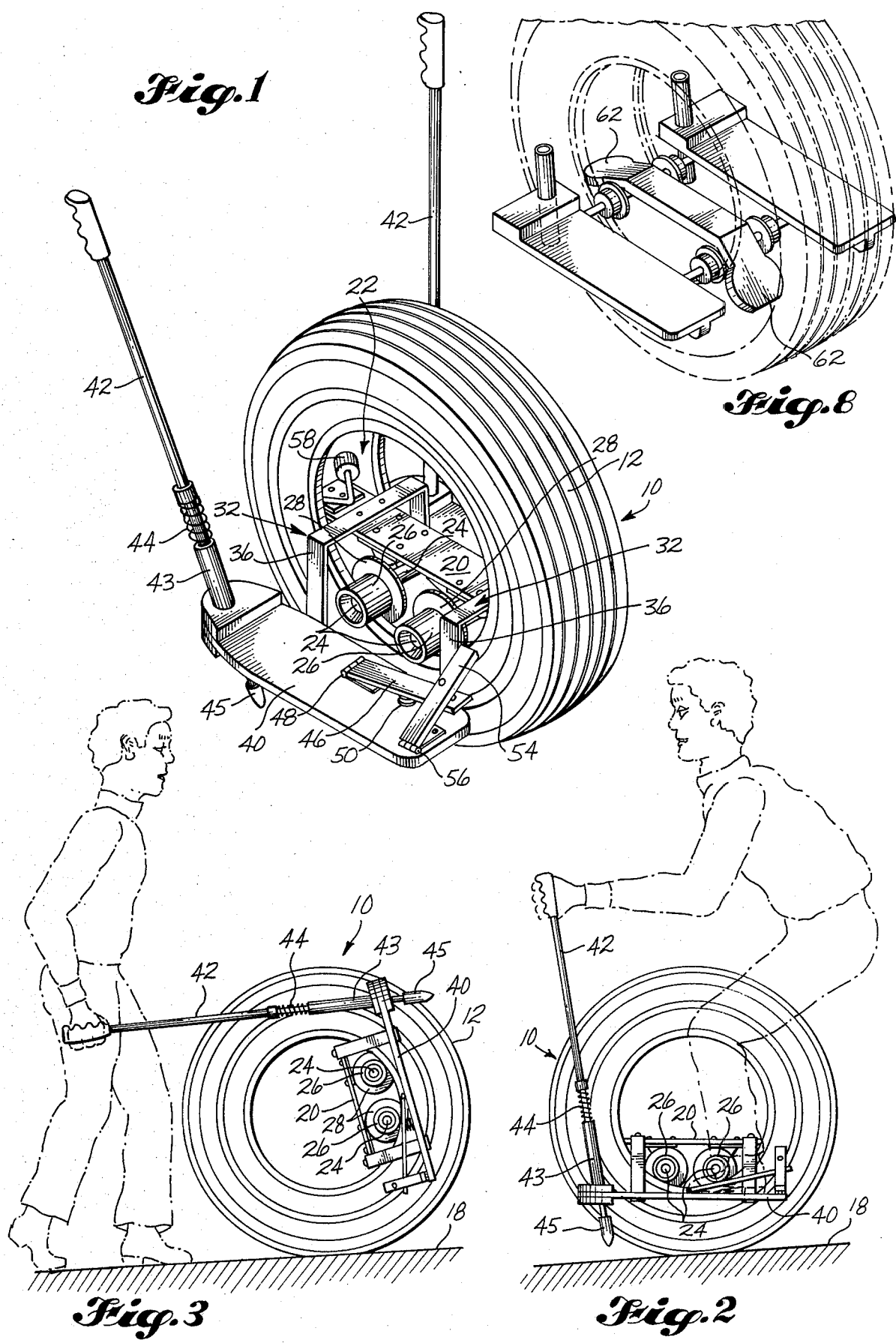

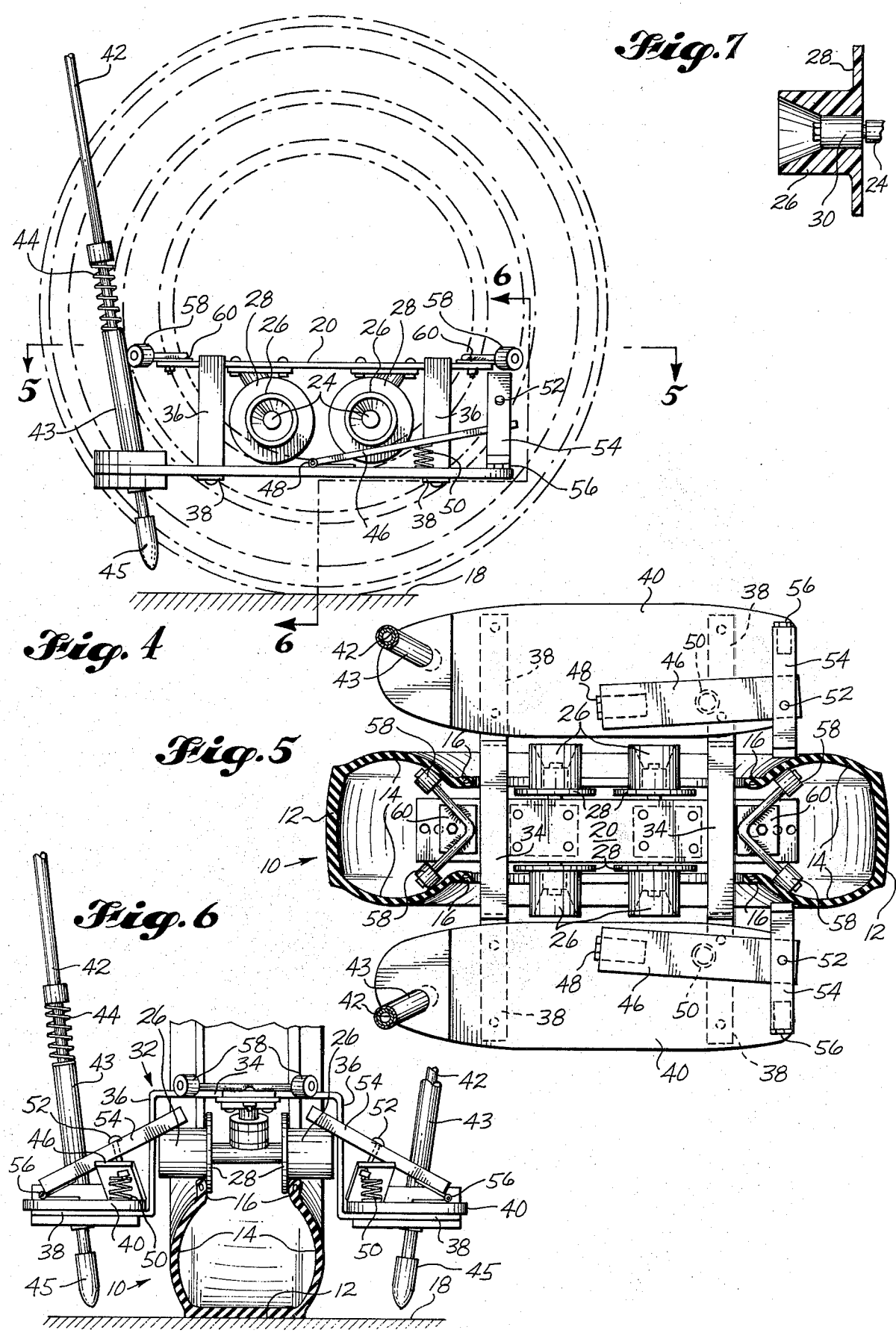

AUTOMOBILE TIRE RIDING VEHICLE

BACKGROUND OF THE INVENTION

1. Field of the Invention

This invention relates to educational and amusement devices and more particularly to an automobile tire riding device competing with such devices as skateboards, skates, skis, and the like, providing for physical exercise and coordination of mind and muscle for those whose become adept as riders of the vehicle.

2. Description of the Prior Art

A search of the domestic and foreign patents discloses that the most pertinent prior art to the present invention are the following:

| U.S. PAT. NOS.: | | |
|---|---|---|
| 87,355 | 1,652,934 | 3,062,560 |
| 186,379 | 2,923,545 | 3,386,753 |
| 1,158,258 | 2,971,773 | 4,106,786 |
| FOREIGN PATENTS: | | |
| French | 332,203 | German 2,117,349 |
| | 932,124 | 355,509 |

Highway codes outlaw the use of automobile tires having less than a set depth of tread. Such used tires, which are outlawed for highway use on automobiles, may be recycled by retreading if they have sound carcasses but many do not. In addition to the amusement and physical coordination development features for riders of vehicles of this invention, the same utilizes such used automobile tires without sound carcasses, which are in abundance, and, in effect, recycles the same.

Taking in reference with the above, the present invention uses new and different parts, and arrangements and combinations thereof to provide a new and useful automobile tire riding vehicle for the pleasure, exercise, and skill of its riders and the utilization of currently wasted resources.

SUMMARY OF THE INVENTION

The present invention is characterized by utilizing used automobile tire carcasses, which have presently little value, as a part of a vehicle which may be ridden for plesure, exercise, and sharpening of one's dexterity. Highway codes prohibit the use of tires on an automobile after the tread is worn down to a certain tread thickness. Many of such tires also have defects which render them unsuitable for retreading. Thus, a great number of used tires become available each year which have little value for ordinary recycling by retreading. Such tires become useful, by reason of this invention, as a part of a tire riding vehicle and the purposes thereof are as indicated by way of example but not by way of limitation.

Fundamentally, the tire riding vehicle of this invention includes a base support extending parallel to the space between the beads of an automobile tire. The base support mounts two spaced apart axles. Two spaced apart rollers are rotatably mounted on each axle. Associated with each roller is a flange. The rollers ride or travel on the tire beads and the flanges are disposed inwardly of, and abut against, the tire beads, and thus maintain the rollers against lateral displacement relative to the tire beads. The base support carries platform means, preferably one on each side relative to the tire, each for supporting a foot of a rider. In case of the shift of weight of a rider tending to urge the forward or rearward rollers away from the tire beads, sets of laterally displaced rollers, or tongues, are provided to engage the inside of the tire adjacent the bead and resist release or movement away from the tire bead of a forward or rearward end of the tire riding vehicle.

DESCRIPTION OF THE DRAWINGS

FIG. 1 is a perspective view of a device of this invention, shown in combination with an automobile tire;

FIG. 2 is a side elevational view of the structure of FIG. 1 and with a person, shown in phantom, riding the vehicle down an incline;

FIG. 3 is a view in side elevation of the structure of FIG. 1, with the vehicle turned approximately at right angles to that shown in FIG. 3, and with a person pushing the vehicle up an incline;

FIG. 4 is an enlarged side elevational view of the vehicle and with the automobile tire shown in phantom;

FIG. 5 is a plan view, taken substantially on broken line 5—5 of FIG. 4, and with the parts of the automobile tire shown in section;

FIG. 6 is an elevational view taken substantially on broken line 6—6 of FIG. 4;

FIG. 7 is a detached sectional view of a combination roller flange used in this invention; and FIG. 8 is a fragmentary view, similar to FIG. 5, of a modified form of my invention.

DESCRIPTION OF THE PREFERRED EMBODIMENT

An automobile tire, generally numbered 10, is illustrated by tread 12, side walls 14, and beads 16. The vehicle of my invention is designed to ride on the beads 16 as the tire 10 rolls or travels on a surface, illustrated as surface 18. Base support 20 extends parallel to the space 22 between the beads 16 of the tire 10. Two spaced apart axles 24 are detachably supported by base support 20. Preferably, the supporting means connecting the axles 24 with the base 20 comprises holes in the base support and detachable nut and bolt means. Extra holes are provided in the base support 20 and thus the spacing between spaced apart roller means 26 can be adjusted to fit automobile tires of different sizes or tires having different diameters of beads 16. Associated with each roller 26 is a circular flange or disc roller means 28. Each roller 26-flange 28 may be formed as a single piece or they may be two separate pieces and secured together by conventional means. On each axle 24 there are spaced apart combination roller-flange means and with a flange 28 abutting against the inner surface of a tire bead 16 and with its associated roller 26 riding on the same tire bead.

In FIG. 7, the roller 26 and flange 28 are shown as integrally formed of any suitable, durable, wear-resistant material and with a substantially frictionless roller bearing 30 mounting the unit on a common shaft support on axle 24.

The base support 20 also supports platform means to support a rider on his or her feet. This may be accomplished by two longitudinally spaced strap members 32, each comprising a central horizontal portion 34, two angularly and vertically extending portions 36, and two side horizontal portions 38. The two longitudinally spaced side horizontal portions 38 of straps 32 support a foot plate 40. Thus a foot plate or platform 40 is supported on each side of the tire 10 in which a rider can support his or her feet, one on each side of the vehicle.

Poles 42 are supported by the foot plates 40, as through sleeves 43 carried by such foot plates 40. Preferably, each pole carries a compression spring 44 tending to urge the poles upwardly and to urge the rubber pole tips 45 out of engagement with the ground or support 18.

Also, each foot pedal 40 supports brake means illustrated by a plurality of lever means. Lever 46 is pivotally connected with foot plate 40 by hinge 48 and resiliently urged out of braking position by spring 50. Lever 46 is connected by pin means 52 with second lever mean 54. Second lever means 54 has one end pivotally connected by second hinge means 56 with foot plate 40 and the other end portion of said second lever means 54 is movable toward and away from the outside surface of a side wall 14 of a tire 10 to function as a brake by contact with the tire 10. The reason for two levers 46 and 54 is to permit the first lever 46 to move in the direction of a foot of a vehicle rider and the second lever means 54 to move at right angles thereto and have a portion thereof to move into and out of engagement with the outer surface of a side wall 14 of a tire 10.

When a driver, resting his or her feet on plates 40, urges his or her weight forward on the forward rollers 26, then the rearward rollers 26 tend to move out of contact and away from the beads 16 of the tire 10 and vice versa when the weight of the rider is urged rearwardly. Thus there is provided means connected with the base support 20 and which will engage the inner walls of the side walls 14 of the tire 10. In the form shown in FIGS. 1 to 6, the same comprises two sets of spring loaded rollers 58, one set connected with each end of the base support 20, as by leaf spring 60. Thus, if a rider tests his or her weight rearwardly, or to the right as respects the showing in FIG. 5, the rollers 58, to the left in FIG. 1, will engage with the inner surface of the side walls 14 of a tire 10 and resist further movement in such direction. On the other hand, if the weight should be shifted forwardly, or to the left as respects the showing in FIG. 5, the rollers 26, to the right in FIG. 5, will engage with the inner surface of the side walls 14 of a tire 10, and resist further movement in such direction. Due to the contact between the rollers and a surface on which they can roll, minimum friction results.

As an alternative construction, I have shown in FIG. 8, tongues 62 connected with the end portions of base support 20 and which extend within the tire 10 and are of a shape and size to come close to, but not make contact with, the inner surfaces of the side walls 14 of tire 10 during normal operation. However, if the forward or rearward rollers 26 are moved, by the rider shifting weight, out of contact with the beads 16 of a tire 10, then the appropriate tongue 62 will contact the inner surfaces of the side walls 14 of a tire 10 to provide the same action as rollers 58 but without the benefits of frictionless contact with tire 10 provided by rollers 58.

In using the vehicle of my invention, the same may be readily pushed up an incline as illustrated in FIG. 3 of the drawings. The vehicle is turned until the poles 42 are slightly less than horizontal. The tire 10 is vertical and one pushes on poles 42 forwardly and slightly downwardly. By so doing, one can readily push the vehicle and the tire up an incline.

When one decides to ride the vehicle down an incline, one foot can be placed on a foot plate 40, hands may grip the poles 42, and the other foot employed to contact the surface 18 and to push the vehicle forwardly until the desired speed of travel is attained. Thereafter, one rides the vehicle with the tire 10 traveling on the surface 18 and with the rollers 26 traveling on the beads 16 of a tire 10. During such travel, the rider grasps the poles 42 as indicated and moves his or her wight in steering the vehicle. Also, if desire, either of the poles 42 may be urged downwardly to engage an end portion 45 with surface 18 and steer the vehicle or both poles may be employed simultaneously as a brake. Also, either or both of the brake means 46–48–50–52–54–56 may be applied for steering or braking of the vehicle.

When going forward and when it is desired to increase or provide forward thrust, one may stand on foot plates 40 and use poles 42 much in the same fashion as skiers provide forward motion to the riders and skiis and with the latter riding on the snow.

SUMMARY

From the foregoing, it now becomes implicit and explicit that a used and otherwise automobile tire, illustrated by tire 10, may become a part or associated with a useful and entertaining vehicle which may be ridden for exercise and amusement. The tire will include such elements as spaced apart beads, adjoining and spaced apart side walls 14, and a ground or surface engaging tread 12. The vehicle used in combination with such tire 10 comprises a base support 20 which extends parallel to the space between the tire beads 16. Two spaced apart axles 24 are parallel to each other and extends at right angles to, and are connected with and supported by, the base support 20. Two spaced apart roller means 26 are rotatively mounted on each axle and each roller 26 is adapted to roll on a tire bead 16. To prevent sidewise or lateral movement of the roller means 26 and maintain each of the rollers 26 tracking on a tire bead 16, two spaced apart flanges 28 are mounted on each axle 24—one flange 28 preferably for each roller 26. While one flange 28 for each axle 24 and a pair of spaced rollers 26 would be helpful in keeping such pair of rollers 26 tracking on two tire beads 16, a flange 28 for each roller 26 is preferable. Each flange 28 is disposed inwardly of, and adjacent one of the rollers 26, and each flange engages the inner surface of a tire bead 16. Platform means, as foot plates 40, are provided to support the feet of a rider and such platform means are connected with and supported by the axles 24 and the roller means 26.

Preferably, the roller means 26 and the flanges 28 are of a one-piece construction as illustrated in FIG. 7 of the drawings. Also, the platform means comprises two foot plates 40, one carried on each side of the vehicle and on each side of the automobile tire 10.

For stability of the rider and permitting best use of transferring the center of body weight of the rider in manipulating travel of the vehicle, the platform means 40 is provided with pole supporting means, as sleeves 43, through which poles 42 may be slid and thus carried by the platform means 40. Poles 42 are provided with compression springs 44 which normally urge the lower end portions 45 of the poles 42 out of contact with the ground 18. However, when desired, a pole or poles 42 may be urged until the lower end or tip 45 contacts with the ground surface 18, and thus provide for selective turning or braking as desired.

Additional braking means are provided by hinged levers 48, 54 and normal release thereof by spring 50 and the braking is preferably provided on both sides of the tire 10. As the base support 20 (and in turn the platforms or foot plates 40) are supported by roller means 26 disposed at the end portion of the base support 20, the weight of a rider with feet on the plates 40 can be shifted forwardly or rearwardly and with a tendency to lift rear rollers 26, when the rider's weight is shifted forwardly and with a vice versa tendency when the weight is shifted rearwardly. To compensate for such tendencies, the spring loaded rollers 58 or the tongues 62 are employed and they will tend to maintain contact between all rollers 26 and the beads 16 of the tire 10.

Obviously, changes may be made in the forms, dimensions, and arrangements of the parts of my invention without departing from the principle thereof, the above setting forth only preferred forms of embodiment of my invention.

I claim:

1. The combination with an automobile tire having spaced apart circular beads, adjoining side walls, and a ground-engaging tread interconnecting said side walls, a tire riding vehicle comprising: a base support extending parallel to the space between tire beads; two spaced apart axles extending at right angles to, and connected with, said base support; two spaced apart roller means rotatively mounted on each of said axles and each adapted to roll on a tire bead; two spaced apart flange means mounted on each axle, each disposed inwardly of, and adjacent one of said roller means, and each engaging the inner surface of a tire bead; and platform means, on which a rider can stand, mounted on said two parallel axles.

2. The combination of claim 1, wherein each roller means and its adjacent flange means is fixedly secured together.

3. The combination of claim 1, wherein said platform means comprises two lateral spaced apart platforms, one on each side of the automobile tire.

4. The combination of claim 1, wherein said platform means is provided with a pole supporting means having an opening therein through which a pole may be inserted and thereby connected with said platform means.

5. The combination of claim 4 with a pole having a spring coil thereon engagable with the pole supporting means and normally urging the lower portion of the pole out of engagement with the surface supporting the automobile tire.

6. The combination of claim 1 with a brake pedal pivotally connected with the platform means, automobile tire contacting means, connected with said brake pedal, and movable into and out of contact with the automobile tire; and spring means normally moving said automobile tire contacting means out of contact with the automobile tire.

7. The combination of claim 3, wherein each of said platforms supports automobile tire contacting braking means.

8. The combination of claim 1, wherein the base support mounts laterally spaced rollers which engage the inside of the automobile tire adjacent the bead and resists release of the tire riding vehicle from the automobile tire.

9. The combination of claim 8, wherein each end portion of the base support supports laterally spaced rollers which resist release of the tire riding vehicle from the automobile tire.

10. The combination of claim 1, wherein the base support mounts a tongue member projecting away therefrom, inwardly of the automobile tire, and into relatively close proximity with the inner sidewalls of such tire.

* * * * *